United States Patent [19]
Tanaka

[11] Patent Number: 5,123,754
[45] Date of Patent: Jun. 23, 1992

[54] LINEAR MOTION GUIDE ASSEMBLY HAVING AN INCREASED LOAD BEARING CAPACITY

[75] Inventor: Kazuhiko Tanaka, Fuchu, Japan

[73] Assignee: Nippon Thompson Co., Ltd., Tokyo, Japan

[21] Appl. No.: 631,598

[22] Filed: Dec. 20, 1990

[30] Foreign Application Priority Data

Dec. 27, 1989 [JP] Japan .................. 1-336693

[51] Int. Cl.$^5$ .............................................. F16C 29/06
[52] U.S. Cl. ........................................ 384/45; 384/43
[58] Field of Search ....................... 384/43, 44, 45, 49

[56] References Cited

U.S. PATENT DOCUMENTS

| | | | |
|---|---|---|---|
| 4,433,876 | 2/1984 | Mottate | 384/45 |
| 4,616,886 | 10/1986 | Teramachi | 384/45 |
| 4,784,498 | 11/1988 | Geka et al. | 384/45 |

FOREIGN PATENT DOCUMENTS

| | | | |
|---|---|---|---|
| 0088218 | 5/1985 | Japan | 384/43 |
| 0155012 | 8/1985 | Japan | 384/43 |
| 0051618 | 2/1990 | Japan | 384/43 |

*Primary Examiner*—Thomas R. Hannon
*Attorney, Agent, or Firm*—Skjerven, Morrill, MacPherson, Franklin & Friel

[57] ABSTRACT

A linear motion guide assembly includes an elongated rail having a top surface formed with a pair of first inner guide grooves having a circular arc cross sectional shape and a pair of side surfaces, each of which is formed with a second inner guide groove having a Gothic arch cross sectional shape. A slider unit includes two first and two second endless circulating paths, each of which includes a load path section, a return path section and a pair of curved connecting path sections connecting the corresponding ends of the load and return path sections. Each of the two first endless circulating paths includes a first outer guide groove having a circular arc cross sectional shape located opposite to a corresponding one of the first inner guide grooves, and each of the two second endless circulating paths includes a second outer guide groove having a Gothic arch cross sectional shaped located opposite to a corresponding one of the second inner guide grooves. A series of roller members such as balls are provided in the first endless circulating paths making contact with each of the first inner and outer guide grooves at one point, whereas each of the balls in the second endless circulating paths makes contact with each of the second inner and outer guide grooves at two points. A pair of retaining means retain the balls in the respective guide grooves of the slider. A relatively large load, vertical or lateral, can be securely supported by the assembly.

4 Claims, 5 Drawing Sheets

FIG. 5a
PRIOR ART
FIG. 5b
PRIOR ART
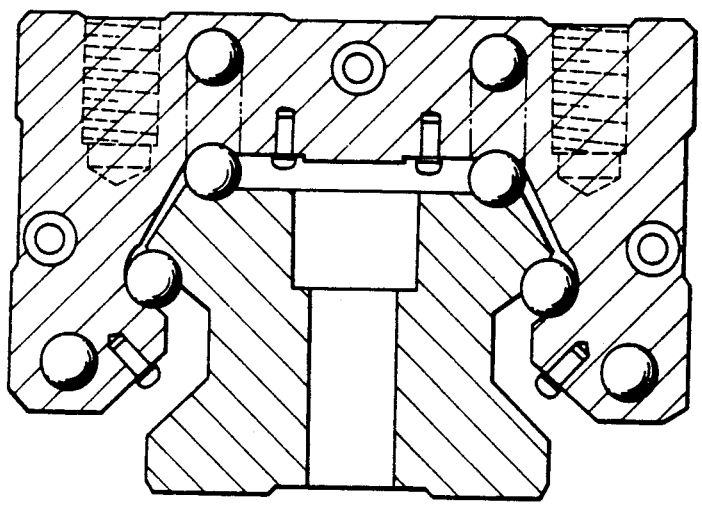
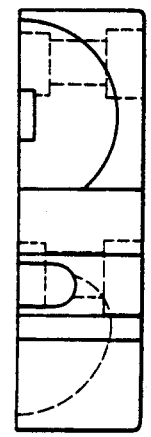
FIG. 5c
PRIOR ART
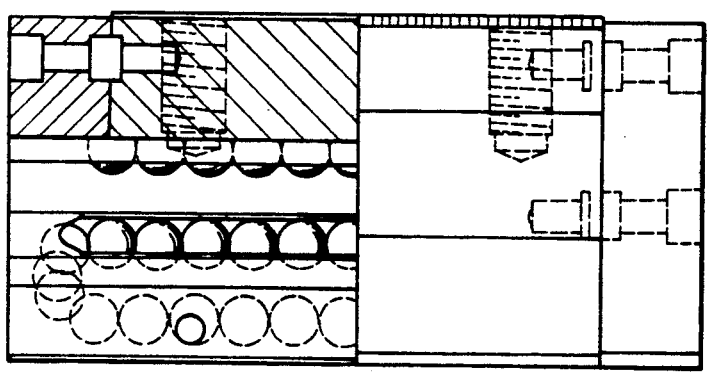
FIG. 5d
PRIOR ART
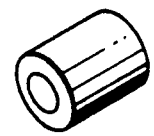
FIG. 5e
PRIOR ART

LINEAR MOTION GUIDE ASSEMBLY HAVING AN INCREASED LOAD BEARING CAPACITY

BACKGROUND OF THE INVENTION

1. Field of the Invention

This invention generally relates to a linear motion guide assembly, and, in particular, to a linear motion guide assembly suitable for bearing a relatively large load.

2. Description of the Prior Art

FIGS. 4a and 4b illustrate the structure of a typical prior art linear motion guide assembly disclosed in the Japanese Pat. Appln. No. 62-9298 (Pat. Laid-open Pub. No. 63-180437). As shown, a pair of arc-shaped guide grooves is provided each at each edge of a rail, and a V-shaped guide groove is formed at each side surface of the rail. Such a structure is advantageous in reducing the overall height of the assembly. However, this structure has a poor capability in carrying a load which is directed vertically downward.

FIGS. 5a through 5e illustrate the structure of another prior art linear motion guide assembly disclosed in the Japanese Pat. Appln. No. 54-15911 (Pat. Post-examination Pub. No. 62-27287). In this structure, since the top guide grooves are provided at the top surface of the rail, it can sustain a relatively large load which is directed vertically downward. However, this structure is not capable of bearing a large load which is directed in a horizontal direction.

Thus, there has been a need to provide a novel linear motion guide assembly which can bear a relatively large load both in the vertical and horizontal directions.

SUMMARY OF THE INVENTION

In accordance with the present invention, there is provided a linear motion guide assembly which includes a rail having a top surface formed with a pair of first inner guide grooves having a first cross sectional shape and a pair of side surfaces, each formed with a second inner guide groove having a second cross sectional shape different from the first cross sectional shape. The assembly also includes a slider unit having a top wall section and a pair of side wall sections, which depend generally vertically from the opposite sides of the top wall section, thereby defining generally a U-shaped cross section. The top wall section has a bottom surface formed with a pair of first outer guide grooves having the first cross sectional shape, each of said first outer guide grooves being located opposite to a corresponding one of the pair of first inner guide grooves when assembled to thereby define a first guide channel. Each of the side wall sections has an inner surface which is formed with a second outer guide groove located opposite to a corresponding second inner guide groove when assembled to thereby define a second guide channel.

The slider unit is also provided with an endless circulating path for each of said first and second outer guide grooves, and the endless circulating path is filled with a plurality of rolling members, such as balls or rollers. Thus, a sliding or rolling contact is provided between the rail and the slider unit so that the slider unit may move linearly along the rail back and forth. In the preferred embodiment, the first cross sectional shape is a circular arc shape and the second cross sectional shape is a Gothic arch shape. With this structure, when balls are used as the rolling members, the balls make contact with the first guide groove at one point and with the second guide groove at two points. Thus, the present linear guide motion assembly can bear a relatively large load both in vertical and horizontal directions.

It is therefore a primary object of the present invention to obviate the disadvantages of the prior art as described above and to provide an improved linear motion guide assembly having an increased load bearing capability both in vertical and horizontal directions.

Another object of the present invention is to provide an improved linear motion guide assembly high in performance and durability and having a relatively long service life.

A further object of the present invention is to provide an improved linear motion guide assembly easy to manufacture low at cost.

Other objects, advantages and novel features of the present invention will become apparent from the following detailed description of the invention when considered in conjunction with the accompanying drawings.

BRIEF DESCRIPTION OF THE DRAWINGS

FIGS. 4a, 4b and 5a through 5e are schematic illustrations showing typical prior art linear motion guide assemblies.

DESCRIPTION OF THE PREFERRED EMBODIMENTS

Figure 1:
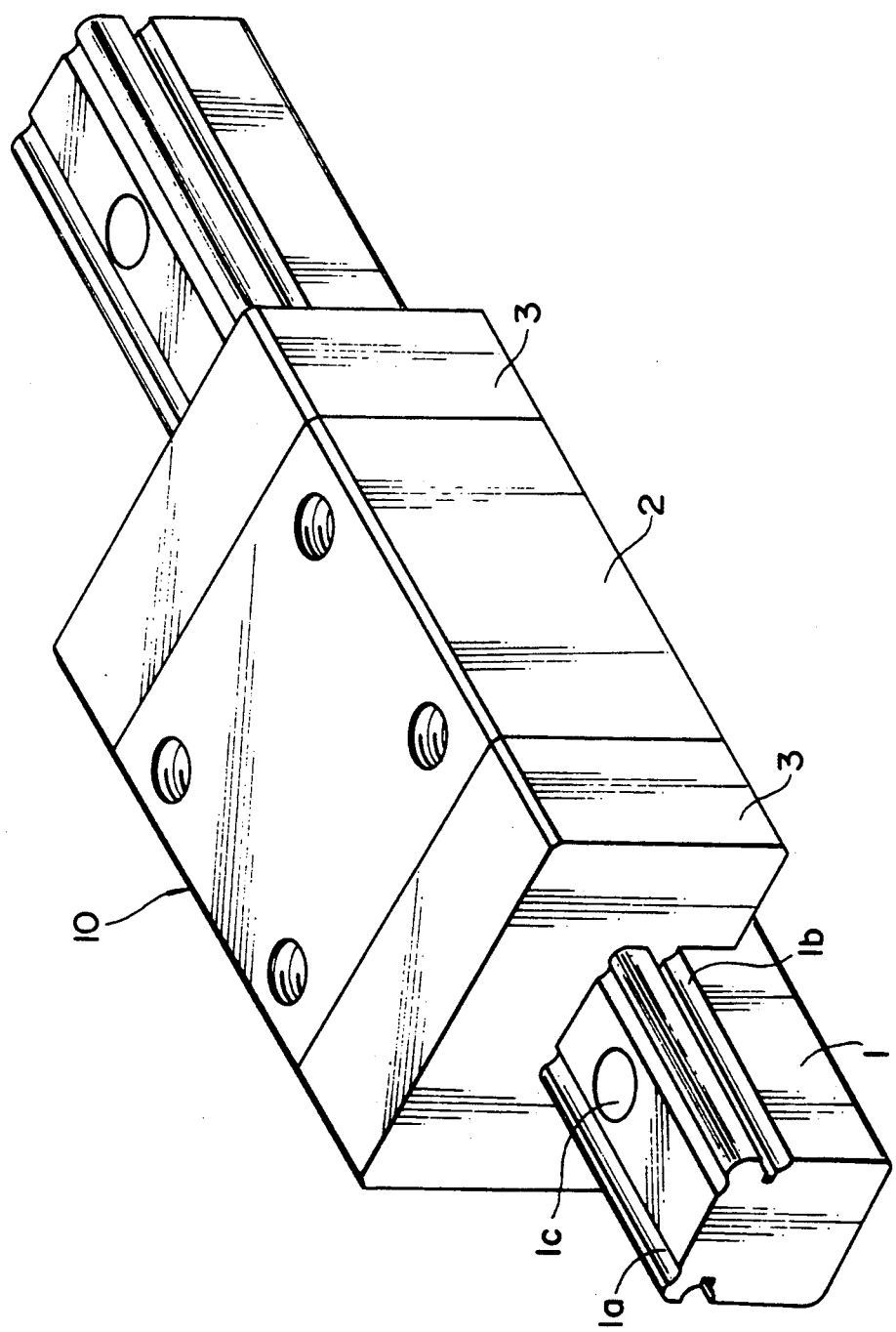
FIG. 1 is a schematic illustration showing in perspective view a linear motion guide assembly constructed in accordance with one embodiment of the present invention.

Referring to FIG. 1, there is schematically shown a linear motion guide assembly constructed in accordance with one embodiment of the present invention. As shown, the present linear motion guide assembly includes a rail 1 which extends straight over a desired length and a slider unit 10 which is slidably mounted on the rail 1. The rail 1 has a top surface which is generally flat and which is formed with a pair of first inner guide grooves 1a having a first cross sectional shape, or a circular arc shape in a preferred embodiment. The rail 1 also has a pair of side surfaces which are generally vertical and each of which is formed with a second inner guide groove 1b having a second cross sectional shape, or a Gothic arch shape in a preferred embodiment. As shown in FIG. 1, the rail 1 is also formed with a plurality of mounting holes 1c which extends through the rail so that bolts may extend therethrough to have the rail 1 fixedly attached to a desired object.

Figure 2:
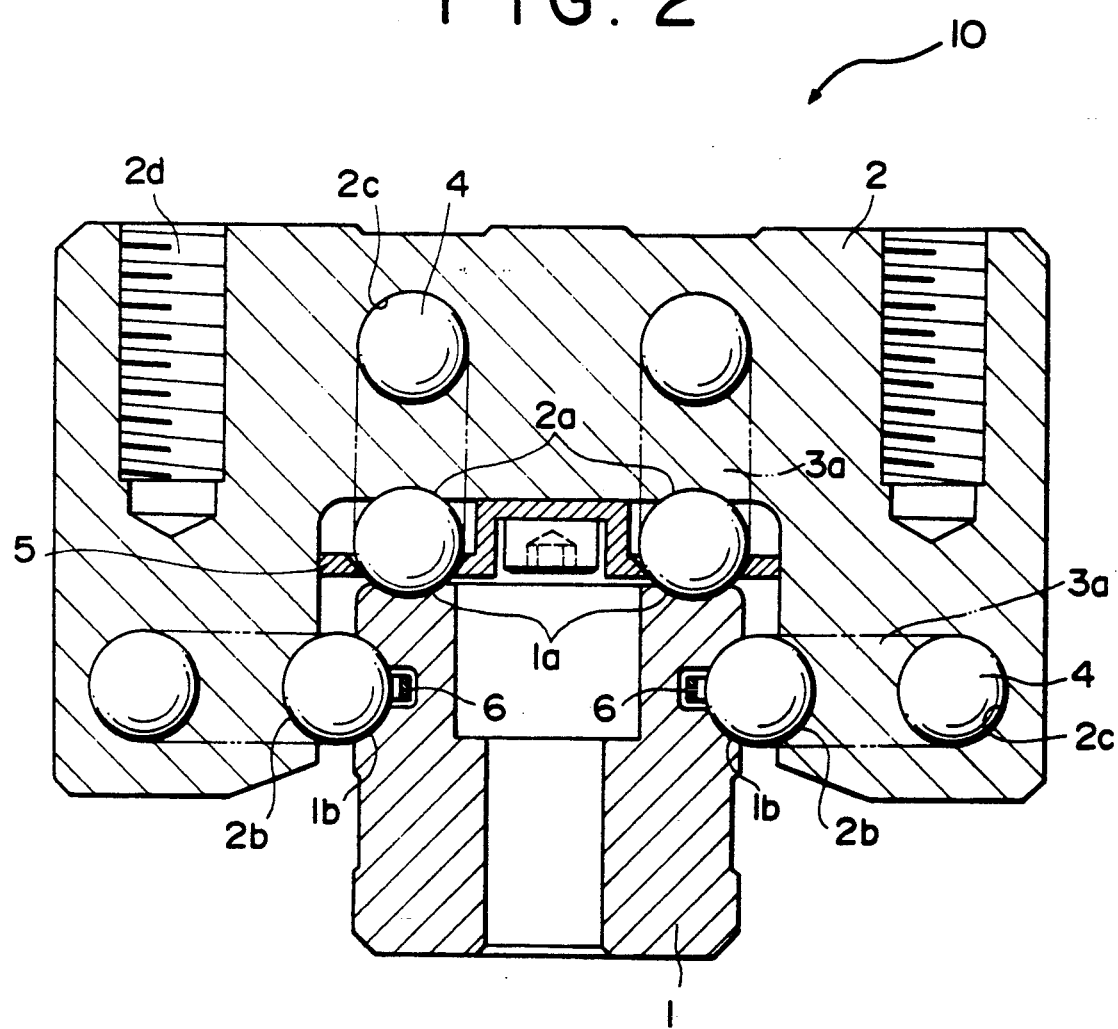
FIG. 2 is a schematic illustration showing the transverse cross section of the assembly shown in FIG. 1.

The slider unit has basically a three-part structure, i.e., a center block 2 and a pair of end blocks 3, each located at each end of the center block 2. As best shown in FIG. 2, the slider unit 10 includes a generally horizontal section and a pair of vertical sections which depend from the respective sides of the horizontal section, thereby defining a U-shaped cross section. A bottom surface of the horizontal section of the slider unit 10 is formed with a pair of first outer guide grooves 2a having the first cross sectional shape, or circular arc cross sectional shape, each of which is located opposite to a corresponding one of the first inner guide grooves 1a to define a first guide channel when assembled. An inner side surface of each of the vertical sections of the slider unit 10 is formed with a second guide groove 2b having the second cross sectional shape, or Gothic arch cross sectional shape, which is located opposite to a corresponding second inner guide groove 1b to define a second guide channel.

As best shown in FIG. 2, the slider unit 10 is provided with four endless circulating paths, each of which includes a load path section, a return path section and a pair of curved connecting path sections connecting the corresponding ends of the load and return path sections, thereby defining an endless circulating path. Each of the first and second guide channels corresponds to a load path section of an endless circulating path. It is to be noted that center block 2 is formed with return path sections and the end blocks 3 are formed with curved connecting path sections. For example, the center block 2 is provided with a return path section 2c of an endless circulating path, which includes a load path section or first guide channel defined by the opposed first inner and outer guide grooves 1a and 2a. This endless circulating path also includes a pair of curved connecting path sections 3a which are formed in the end blocks 3. Each of the vertical sections of the center block 2 is formed with a return path section 2c, which is in communication with the second guide channel or load path section defined by the opposed second inner and outer guide grooves 1b and 2b through a pair of curved connecting path sections 3a formed in the end blocks 3.

A plurality of balls 4 are provided in each of the four endless circulating paths so that the slider unit 10 is in rolling contact with and slidably movable relative to the rail 1 along its longitudinal length. Since the balls 4 circulate along the associated endless circulating paths, the slider unit 10 can move indefinitely along the rail 1 in any direction as long as the rail 1 exists. The slider unit 10 is also provided with a ball retainer plate 5 for preventing the balls 4 from slipping away when disassembled. The slider unit 10 is also provided with a ball retainer band 6 for each of the second guide channels for preventing the balls 4 from slipping away therefrom when disassembled. The center block 2 is formed with a plurality of mounting threaded holes 2d at its top surface so that any desired object may be fixedly attached to the top surface of the slider unit 10.

Figure 3:
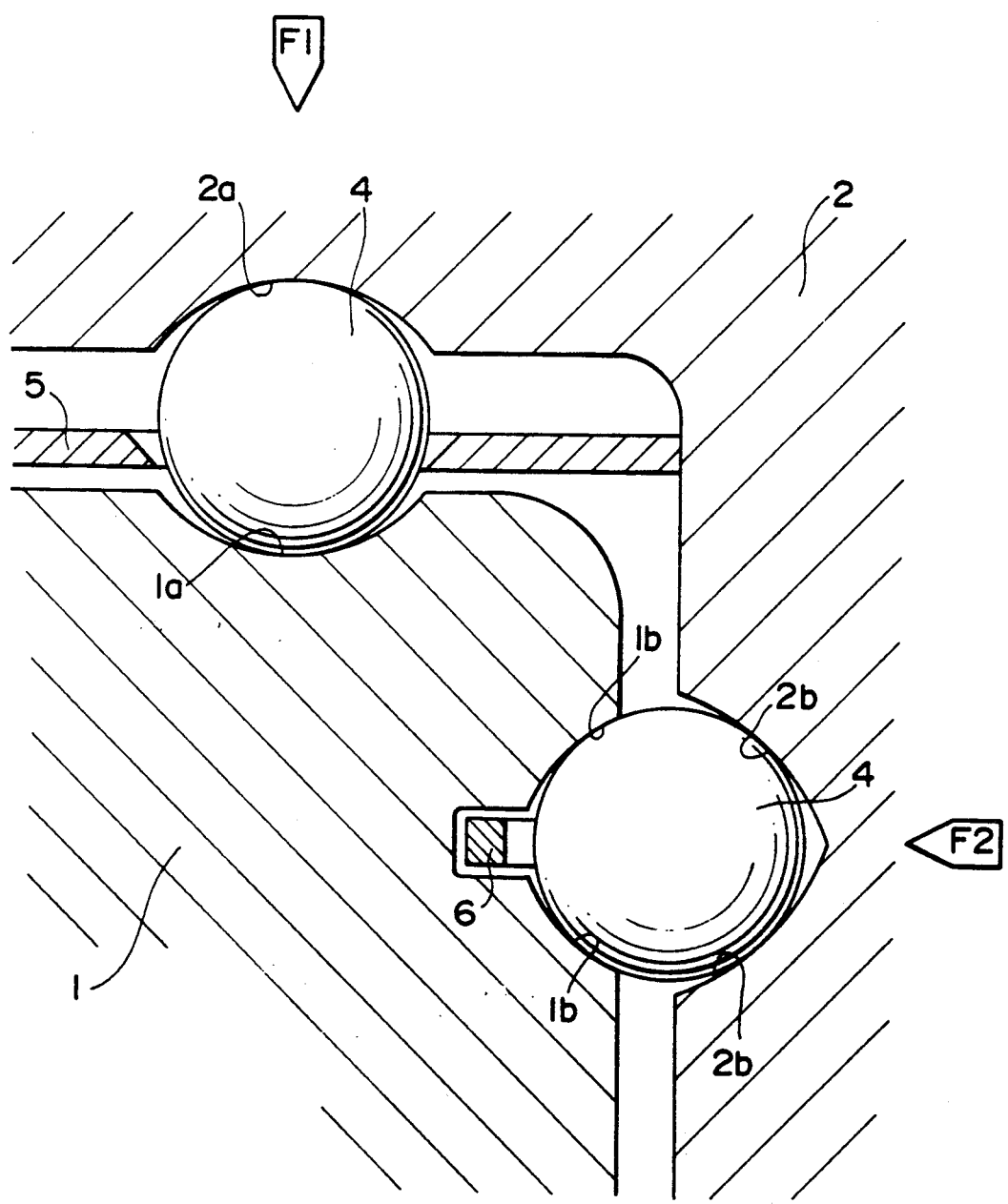
FIG. 3 is a schematic illustration showing on a somewhat enlarged scale a main portion of the structure of the assembly shown in FIGS. 1 and 2.
Figure 4A:
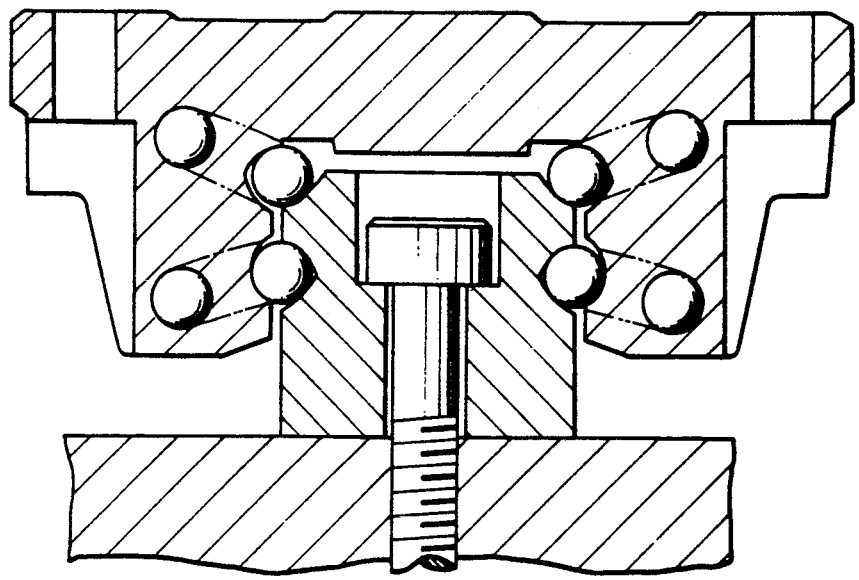
Figure 4B:
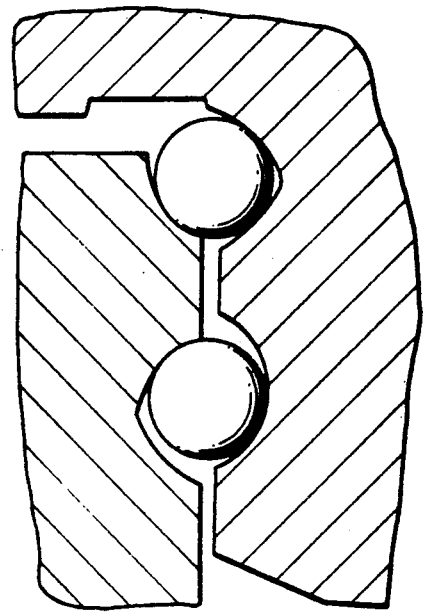

As best shown in FIG. 3, each of the first inner and outer guide grooves 1a and 2a has a circular arc cross sectional shape. As a result, each of the balls 4 makes contact with each of the first inner and outer guide grooves 1a and 2a at one point. The contact points between the balls 4 and the first inner and outer guide grooves 1a and 2a are vertically aligned substantially. Thus, the first inner and outer guide grooves 1a and 2a can bear a relatively large, vertically downward load F1. On the other hand, each of the second inner and outer guide grooves 1b and 2b has a Gothic arch cross sectional shape. As a result, each of the balls 4 makes contact with each of the second inner and outer guide grooves 1b and 2b at two points. Thus, the second inner and outer guide grooves 1b and 2b can contribute to bear not only a horizontally oriented load F2, but also a vertically downwardly oriented load.

Therefore, there is provided a linear motion guide assembly which can bear a relatively large load both in vertical and horizontal directions. Moreover, the present linear motion guide assembly has an extended service life because of its durable structure, and it can provide a high precision and high performance linear motion.

While the above provides a full and complete disclosure of the preferred embodiments of the present invention, various modifications, alternate constructions and equivalents may be employed with out departing from the true spirit and scope of the invention. Therefore, the above description and illustration should not be construed as limiting the scope of the invention, which is defined by the appended claims.

What is claimed is:

1. A linear motion guide assembly comprising:
   a rail extending over a desired length, said rail having a top surface formed with a pair of first inner guide groove having a first cross sectional shape and a pair of side surfaces, each formed with a second inner guide groove having a second cross sectional shape;
   a slide unit having a horizontal section and a pair of vertical sections which depend from the opposite sides of the horizontal section, said slider unit being provided with a pair of first endless circulating paths each of which includes a first outer guide groove having a first cross sectional shape, located opposite to a corresponding one of said first inner guide grooves and with a pair of second endless circulating paths each of which includes a second outer guide groove having a second cross sectional shape, located opposite to a corresponding one of said second inner guide grooves;
   a plurality of rolling members provided in each of the first and second endless circulating paths to thereby provide a rolling contact between said rail and said slider unit;
   wherein said first and second cross sectional shapes are so selected that each of said rolling members provided in said first endless circulating paths makes contact with each of said first inner and outer guide grooves at one point and each of said rolling members provided in said second endless circulating paths makes contact with each of said second inner and outer guide grooves at two points; wherein said first cross sectional shape is a circular arc cross sectional shape and said second cross sectional shape is a Gothic arch cross sectional shape;
   first retaining means fixedly mounted on said slider unit for retaining said rolling members in position while located in said first outer guide grooves; and
   a discrete second retaining means provided on said slider unit and extending in the guide assembly into the rail second inner guide grooves for retaining said rolling members in position while located in said each of said second outer guide grooves.

2. The assembly of claim 1, wherein said slider unit has a three-part structure including a center block and a pair of end blocks each located at each end of said center block.

3. The assembly of claim 1, wherein said first retaining means includes a ball retainer plate fixedly mounted at a bottom surface of said slider unit.

4. The assembly of claim 1, wherein said second retaining means includes a ball retainer band provided at a side surface of said slider unit.

* * * * *